United States Patent [19]
Ohba

[11] Patent Number: 6,101,193
[45] Date of Patent: Aug. 8, 2000

[54] PACKET SCHEDULING SCHEME FOR IMPROVING SHORT TIME FAIRNESS CHARACTERISTIC IN WEIGHTED FAIR QUEUEING

[75] Inventor: Yoshihiro Ohba, Tokyo, Japan

[73] Assignee: Kabushiki Kaisha Toshiba, Kawasaki, Japan

[21] Appl. No.: 08/926,474

[22] Filed: Sep. 10, 1997

[30] Foreign Application Priority Data

Sep. 10, 1996 [JP] Japan ...................................... 8-239159

[51] Int. Cl.[7] .............................. H04L 12/54; H04L 12/56
[52] U.S. Cl. ........................... 370/429; 370/395; 370/418
[58] Field of Search .................................... 370/395, 418, 370/429

[56] References Cited

U.S. PATENT DOCUMENTS

| | | | |
|---|---|---|---|
| 5,231,633 | 7/1993 | Hluchyj et al. | 370/429 |
| 5,533,020 | 7/1996 | Byrn et al. | 370/395 |
| 5,706,288 | 1/1998 | Radhakrishnan et al. | 370/418 |

OTHER PUBLICATIONS

Lixia Zhang, "VirtualClock: A New Traffic Control Algorithm for Packet Switching Networks", Sigcomm '90, (1990), pp. 19–29.

M. Shreedhar, et al., "Efficient Fair Queuing Using Deficit Round Robin", Sigcomm '95, (1995), pp. 231–242.

S. J. Golestani, "A Self–Clocked Fair Queueing Scheme For Broadband Applications", IEEE Infocom '94, (1994), pp. 5c.1.1–5c.1.11.

Primary Examiner—Hassan Kizou
Assistant Examiner—John Pezzlo
Attorney, Agent, or Firm—Oblon, Spivak, McClelland, Maier & Neustadt, P.C.

[57] ABSTRACT

A packet scheduling scheme which is capable of improving the fairness characteristic in a short time scale by suppressing the burstiness of traffic compared with the conventional weight fair queueing algorithm such as DRR. Packets are held in a plurality of packet queues by inputting arrived packets into the packet queues. Then, an output packet queue is sequentially selected from the packet queues, according to a prescribed criterion based on an amount of packets currently transmittable by each packet queue, such that the output packet queue is selected to be different from a previously selected output packet queue when there are more than one packet queues that satisfy the prescribed criterion. Then, a top packet is outputted from the sequentially selected output packet queue.

21 Claims, 8 Drawing Sheets

PACKET SCHEDULING SCHEME FOR IMPROVING SHORT TIME FAIRNESS CHARACTERISTIC IN WEIGHTED FAIR QUEUEING

BACKGROUND OF THE INVENTION

1. Field of the Invention

The present invention relates to a packet scheduling scheme based on the weighted fair queueing in which packet outputs are scheduled without using a sorting processing.

2. Description of the Background Art

The conventionally available Internet based on IP (Internet Protocol) has been a best-effort network which is aimed at sure delivery of packets to their destinations without failure, without guaranteeing QOS (Quality Of Service) such as network delay. However, in the Internet of the recent years, there is a transition to an architecture that accounts for the guarantee of QOS. In such a case, the QOS is to be guaranteed for each "flow" which is defined by a source address, a destination address, a protocol number, a TCP/UDP port number, etc. that are specified in the IP packet header.

On the packet transfer level, packet queues are provided in correspondence to flows, and the packet queue scheduling is carried out. A known packet queue scheduling scheme includes a weighted fair queueing that gives different weights to different flows according to their utilization bandwidths, and services the packet queues fairly by accounting for the packet lengths at a rate according to the weights. Specific algorithms for this weighted fair queueing include an algorithm called SCFQ (Self-Clocked Fair Queueing) as disclosed in: S. J. Golestani, "A Self-Clocked Fair Queueing Scheme for Broadband Applications", Proc. of IEEE INFOCOM '94, pp. 636–646, 1994, and a similar algorithm called Virtual Clock as disclosed in: L. Zhang, "Virtual Clock: A New Traffic Control Algorithm for Packet Switching Networks", Proc. of ACM SIGCOMM '90, pp. 18–29, 1990.

In general, in the weighted fair queueing, a timestamp calculated according to a weight or an arriving packet length is attached to a packet or a packet queue, and a packet with a smaller timestamp or a packet in a packet queue with a smaller timestamp is sequentially selected and outputted in principle. Here, in order to select a packet or a packet queue with the smallest timestamp from all output candidates, there is a need for the sorting processing or the semi-ordered tree management, and the amount of calculations required for them is in an order of $\log_2 N$, where N is a number of flows.

In view of this fact, there has been a proposition for a type of packet scheduling algorithm called DRR (Deficit Round Robin) which does not call for the sorting, as disclosed in: M. Shreedhar and G. Varghese, "Efficient Fair Queueing using Deficit Round Robin", Proc. of ACM SIGCOMM '95, pp. 231–242, 1995.

In the following, the principle of the DRR will be described briefly.

As shown in FIG. 1, the DRR uses packet queues 120 provided in correspondence to flows in conjunction with an active list which holds flow IDs of (active) packet queues in which packets are currently queued and a counter which indicates a number of bytes that are currently transmittable by each flow. Here, weights of the flows a, b, c and d will be denoted as $w_a$, $w_b$, $w_c$ and $w_d$ (bytes). Note that these weights are to be set greater than or equal to the maximum packet length.

In FIG. 1, a character string appearing in each packet indicates a packet identification information. For example, a packet with an indication "b3(200)" is the third arrived packet of the flow b, whose packet length is 200 bytes. In this example, it is assumed that there are four flows a, b, c and d.

A Next field of the active list holds a flow ID of a next active packet queue. In addition, the active list also has pointers for pointing flow IDs of table entries that are head, tail and currently selected ones among the active flows, which are respectively denoted as Head, Tail and Now. In FIG. 1, entries for the flows a, b, d are linked in this order, so that Head points to the flow a, Tail points to the flow d and Now points to the flow a. A value of Now is initially set at Head, and reset to Head when it reaches to Tail. A time period by which Now goes around from Head to Tail once will be called a round.

Now, assuming that $w_a = w_b = w_c = w_d = 500$ (bytes), the weight 500 is entered into the counter as an initial value. A packet output unit 130 reads out a flow ID f (f=a in this example) from the entry pointed by Now in the active list, and continues to output packets from the corresponding packet queue 120 as long as a difference between a value of the corresponding counter and a packet length of a top packet in the corresponding packet queue 120 is greater than or equal to 0 and the corresponding packet queue 120 is active, while decrementing a value of the corresponding counter as much as a packet length of each outputted packet. Then, a value of the corresponding counter is incremented by Wf if the corresponding packet queue 120 is still active, whereas a value of the corresponding counter is set equal to $W_f$ otherwise, and then, Now is updated. Now is reset to Head if Now has already been at Tail, whereas Now is set at the next entry otherwise. Then, the similar processing is repeated for the entry newly pointed by Now.

When the packet queue 120 becomes active due to an arrival of a packet, the active list is immediately updated. For example, in FIG. 1, when the packet queue 120 for the flow c becomes active, the Next field of the table entry for the flow b is changed from d to c, and the Next field of the table entry for the flow c is set to be d.

In a situation depicted in FIG. 1, assuming that no packet newly arrives, the packet output sequence within one round will be: a1(100), b1(300), b2(100), d1(300), d2(100); and values of the counters for the flows a, d, c and d at the end of one round will be 900, 600, 500 and 500, respectively. Namely, in the DRR, for each flow from which a next packet could not have been outputted because a packet length of that next packet was greater than the counter value in the previous round, a number of bytes that were allowed to be outputted but not actually outputted in the previous round will be added to the counter value for the next round so that as many number of bytes more than the weight can be outputted in the next round.

According to this DRR, a time required for the packet output unit 130 to select the next output packet becomes constant regardless of a number of flows. In addition, it is possible to guarantee the maximum value of the delay when the flow input traffic obeys the reported traffic parameter, as well as the fairness in a time scale longer than one round.

However, in the DRR, once the flow is selected, it will continue to select packets from the same flow until it becomes no longer possible to decrement the counter or the packet queue becomes empty, so that the burstiness for each flow becomes large in a time period shorter than one round, and the fairness characteristic will be degraded. This tendency becomes more prominent when the maximum packet length becomes longer, that is, when the minimum value of the weight becomes larger.

Thus the DRR, which is one example of the conventional weighted fair queueing algorithms, is associated with the problem that the fairness characteristic is degraded because the burstiness for each flow becomes large in a time period shorter than one round.

SUMMARY OF THE INVENTION

It is therefore an object of the present invention to provide a packet scheduling scheme which is capable of improving the fairness characteristic in a short time scale by suppressing the burstiness of traffic compared with the conventional weight fair queueing algorithm such as DRR.

According to one aspect of the present invention there is provided a packet scheduling apparatus, comprising: a plurality of packet queues for holding packets; an input unit for inputting arrived packets into the packet queues; a scheduling unit for sequentially selecting an output packet queue from the packet queues, according to a prescribed criterion based on an amount of packets currently transmittable by each packet queue, such that the output packet queue is selected to be different from a previously selected output packet queue when there are more than one packet queues that satisfy the prescribed criterion; and an output unit for outputting a top packet from the output packet queue sequentially selected by the scheduling unit.

According to another aspect of the present invention there is provided a packet scheduling apparatus, comprising: a plurality of packet queues to which weights for packet output purpose can be assigned independently; a packet input unit which inputs received packets into prescribed ones of the packet queues; a counter unit which holds counter values indicating an amount of packets currently transmittable by each packet queue; a scheduling unit which holds scheduling information to be used for outputting packets held in the packet queues, and selects an output packet queue from which a top packet is to be outputted according to the scheduling information; and a packet output unit which outputs a top packet from the output packet queue selected by the scheduling unit; wherein the scheduling unit has first and second scheduling queues for holding the scheduling information corresponding to top packets of non-empty packet queues; the first scheduling queue holds the scheduling information of those packet queues for which a value obtained by subtracting a packet length of a top packet from a corresponding counter value is greater than or equal to 0, while the second scheduling queue holds the scheduling information of those packet queues for which a value obtained by subtracting a packet length of a top packet from a corresponding counter value is less than 0; the scheduling unit takes out one scheduling information from the first scheduling queue, at a time of packet output; the scheduling unit sets a value of a corresponding weight to a corresponding counter value, if the output packet queue becomes empty as a result of said packet output; the scheduling unit decrements a corresponding counter value as much as a packet length of a packet outputted by said packet output, if the output packet queue does not become empty as a result of said packet output and the scheduling information for a new top packet of the output packet queue resulting from said packet output is to be entered into the first scheduling queue; the scheduling unit increments a corresponding counter value as much as a value of a corresponding weight, if the output packet queue does not becomes empty as a result of said packet output and the scheduling information for a new top packet of the output packet queue resulting from said packet output is to be entered into the second scheduling queue; and the scheduling unit switches the first scheduling unit and the second scheduling unit, if the first scheduling queue becomes empty as a result of said packet output.

According to another aspect of the present invention there is provided a packet scheduling method, comprising the steps of: holding packets in a plurality of packet queues by inputting arrived packets into the packet queues; sequentially selecting an output packet queue from the packet queues, according to a prescribed criterion based on an amount of packets currently transmittable by each packet queue, such that the output packet queue is selected to be different from a previously selected output packet queue when there are more than one packet queues that satisfy the prescribed criterion; and outputting a top packet from the output packet queue sequentially selected by the scheduling step.

According to another aspect of the present invention there is provided an article of manufacture, comprising: a computer usable medium having computer readable program code means embodied therein for causing a computer to function as a scheduler of a packet scheduling apparatus having a plurality of packet queues for holding packets, an input unit for inputting arrived packets into the packet queues, and an output unit for outputting a top packet from one packet queue, the computer readable program code means including: first computer readable program code means for causing said computer to judge whether each packet queue satisfies a prescribed criterion based on an amount of packets currently transmittable by each packet queue; and second computer readable program code means for causing said computer to sequentially select an output packet queue from the packet queues according to the judgement made by the first computer readable program code means such that the output packet queue is selected to be different from a previously selected output packet queue when there are more than one packet queues that satisfy the prescribed criterion.

Other features and advantages of the present invention will become apparent from the following description taken in conjunction with the accompanying drawings.

DETAILED DESCRIPTION OF THE PREFERRED EMBODIMENTS

Figure 1:
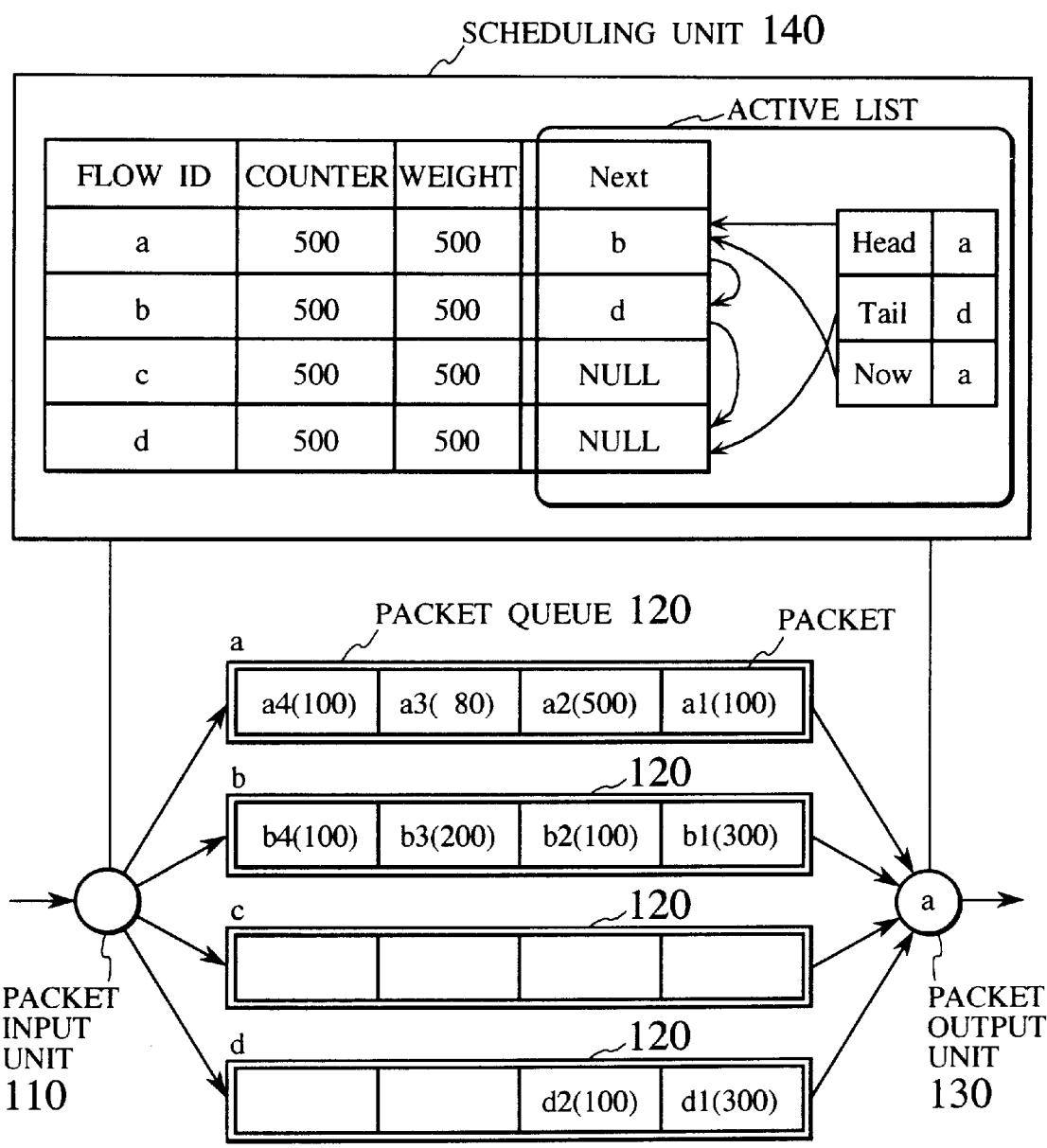
FIG. 1 is a block diagram of a packet scheduling apparatus according to a conventional packet scheduling scheme called deficit round robin.
Figure 2:
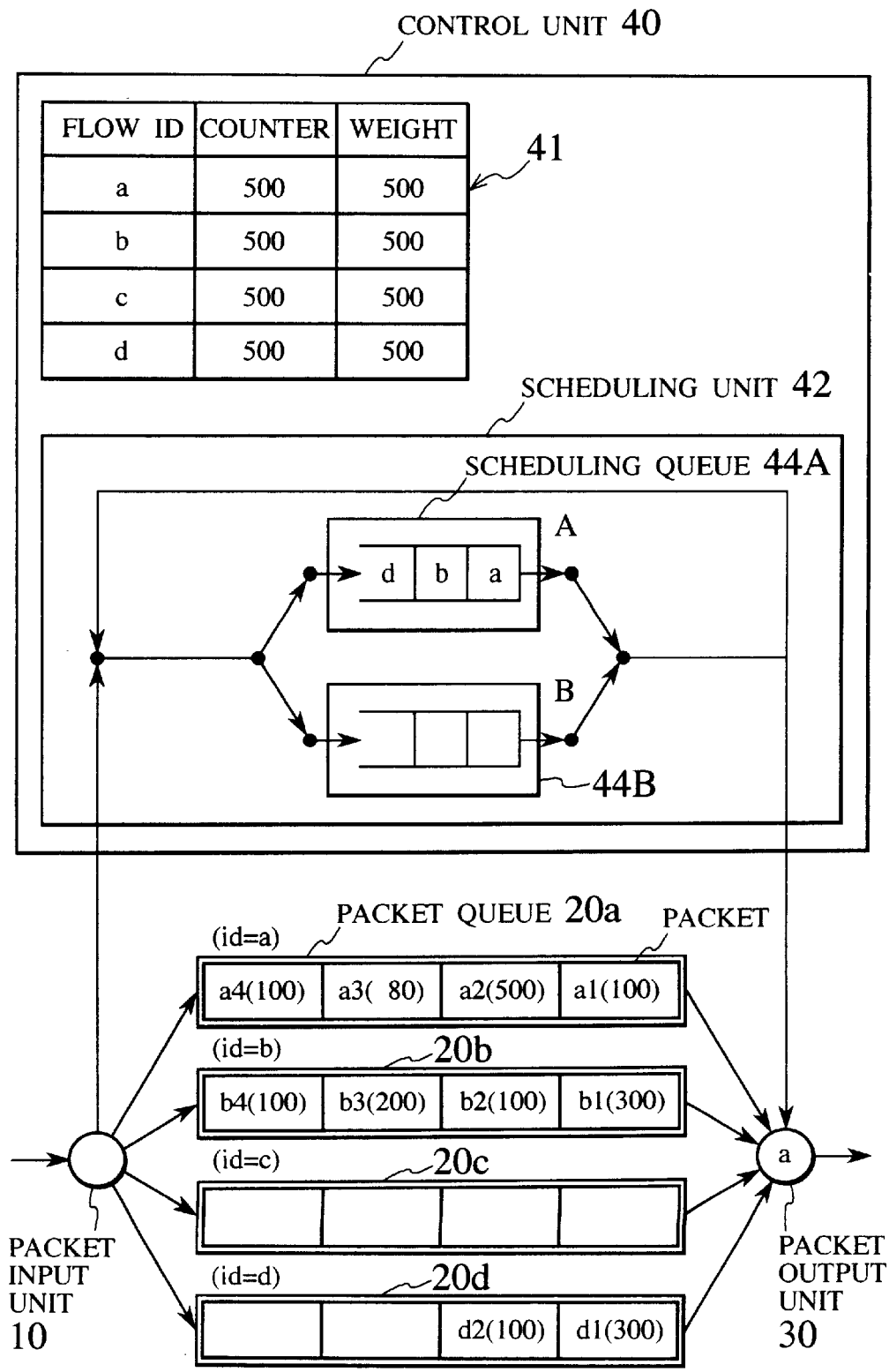
FIG. 2 is a block diagram of a packet scheduling apparatus in the first embodiment of a packet scheduling scheme according to the present invention, in one exemplary state at the beginning of a round.
Figure 3:
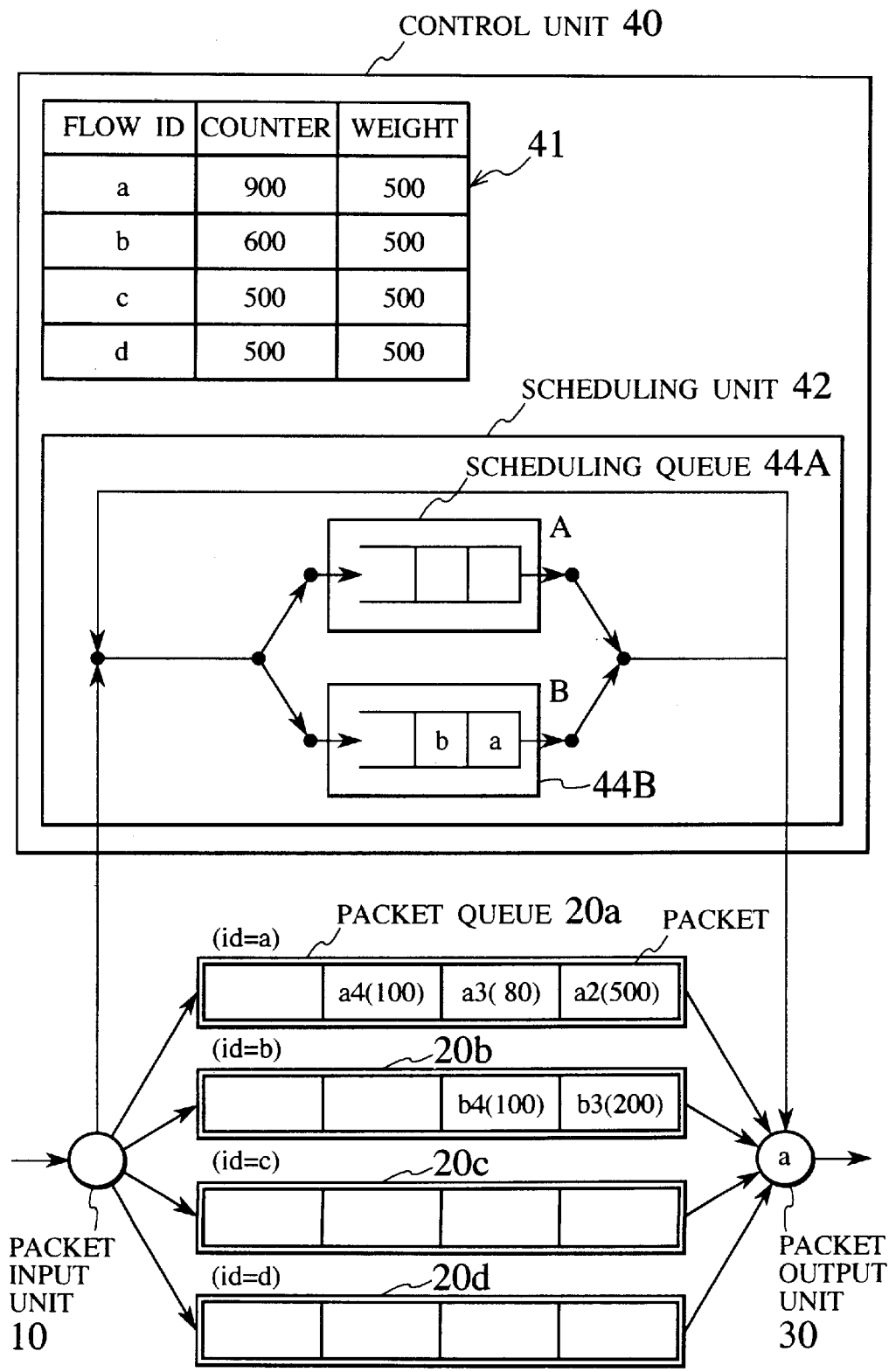
FIG. 3 is a block diagram of a packet scheduling apparatus in the first embodiment of a packet scheduling scheme according to the present invention, in another exemplary state at the end of a round.

Referring now to FIG. 2 and FIG. 3, the first embodiment of a packet scheduling scheme according to the present invention will be described in detail.

FIG. 2 shows a configuration of a packet scheduling apparatus according to this first embodiment, which generally comprises a packet input unit 10, a prescribed number (four in this embodiment) of packet queues 20 (20a, 20b, 20c and 20d) provided in correspondence to flows, a packet output unit 30 and a control unit 40.

The control unit 40 functions to schedule the packet outputs, and has a scheduling unit 42 and a memory unit 41 for holding a counter value and a weight value in correspondence to each flow ID. The scheduling unit 42 has two scheduling queues 44 (44A and 44B).

The packet input unit 10 inputs an arrived packet into an appropriate packet queue 20 selected according to a header of the arrived packet, while also inputting a scheduling information into the scheduling unit 42.

The scheduling unit 42 takes out the scheduling information from one of the two scheduling queues 44 which is currently selected for the scheduling information output, and gives this scheduling information to the packet output unit 30.

The packet output unit 30 outputs a top packet from the packet queue 20 which is specified by the scheduling information given from the scheduling unit 42.

The packet queues 20 can be assigned with independent weights for the purpose of packet output, and the counter value for each flow in the memory unit 41 holds an amount of packets that are currently transmittable from the packet queue 20 for each flow which is determined from the weight value and the packet length of the output packet.

Next, the operations of the scheduling unit 42 will be described.

When a packet arrived at a non-empty packet queue, the scheduling unit 42 does not enter the scheduling information into either scheduling queue 44.

On the other hand, when a packet arrived at an empty packet queue, the the scheduling unit 42 carries out the following operations.

When both of the scheduling queues 44 are empty, the scheduling information of the arrived packet may be entered into either the scheduling queue 44 which is currently selected for the scheduling information output or the scheduling queue 44 which is currently not selected for the scheduling information output (the latter choice is adopted in this embodiment). Here, however, when the scheduling information is to be entered into the scheduling queue 44 which is currently not selected for the scheduling information output, roles of the scheduling queue 44 which is currently selected for the scheduling information output and the scheduling queue 44 which is currently not selected for the scheduling information output should be switched immediately.

On the other hand, when either one of the scheduling queues 44 is non-empty, if the criterion of [(corresponding counter value)−(packet length of arrived packet)]≧0 is satisfied, the scheduling information is entered into the scheduling queue 44 which is currently selected for the scheduling information output, and otherwise the scheduling information is entered into the scheduling queue 44 which is currently not selected for the scheduling information output.

Next, at a time of packet output from some packet queue, the scheduling unit 42 carries out the following operations.

(1) When that packet queue is going to be empty as a result of this packet output, the weight value is set into the corresponding counter. Here, the timing for setting the weight value into the corresponding counter can be either a timing immediately after the end of the current round or a timing of a new packet arrival at this packet queue after the end of the current round.

(2) When that packet queue is not going to be empty as a result of this packet output, if a value obtained by subtracting a packet length of a next packet which becomes a new top packet after this packet output from the counter value is greater than or equal to 0, a packet length of the output packet is subtracted from the counter value, and the scheduling information for the flow of that packet queue is entered into the scheduling queue 44 which is currently selected for the scheduling information output.

(3) When that packet queue is not going to be empty as a result of this packet output, if a value obtained by subtracting a packet length of a next packet which becomes a new top packet after this packet output from the counter value is less than 0, the weight value is added to the counter value, and the scheduling information for the flow of that packet queue is entered into the scheduling queue 44 which is currently not selected for the scheduling information output.

In addition, when the scheduling queue 44 which is currently selected for the scheduling information output becomes empty as a result of this packet output, the scheduling unit 42 next selects the other scheduling queue 44 for the subsequent scheduling information output, that is, the scheduling unit 42 switches the scheduling queues 44.

In FIG. 2, a character string appearing in each packet indicates a packet identification information. For example, a packet with an indication "b3(200)" is the third arrived packet of the flow b, whose packet length is 200 bytes. Here, the packet may have a variable length. Also, it is assumed that there are four flows a, b, c and d.

In the present invention, the flow can be defined any suitable manner according to the need. Usually, in a case of handling IP packets, the flow is defined according to a source address, a destination address, a protocol number, TCP/UDP port number, etc., of the IP packet.

In this embodiment, the maximum packet length is assumed to be 500 bytes, and the weights $w_a$, $w_b$, $w_c$ and $w_d$ of the flows a, b, c and d are assumed to be all equal to each other for the sake of simplicity, although the weights of the different flows may be different in general. For the sake of definiteness, it is assumed that $w_a=w_b=w_c=w_d=500$ (bytes) in the following description.

Also, in this embodiment, the counter value (amount of packets), a packet length of a packet, and the weight value are all expressed in byte units, but they can be expressed in any desired units.

Also, in this embodiment, the flow ID will be utilized as the scheduling information, but the scheduling information that can be used in the present invention is not limited to this particular form. Namely, it is also possible to utilize some other information in conjunction with the flow ID as the scheduling information. For instance, the flow ID and a packet length of a top packet may be used as the scheduling information.

Now, the operation of the packet scheduling apparatus of FIG. 2 will be described in detail by using a concrete example.

FIG. 2 shows an exemplary state of the packet scheduling apparatus in which four packets from the flow a, four packets from the flow b, and two packets from the flow d have arrived after the scheduling operation start and no packet has been outputted yet. Here, it is assumed that the scheduling queue 44B has been currently selected for the scheduling information output.

In this state, the counter values are all 500, while a packet length is less than or equal to 500 bytes, so that the flow IDs a, b and d of the flows a, b and d for which the packet queues 20 are not empty are entered into the scheduling queue 44A which is currently not selected for the scheduling information output, as shown in FIG. 2.

When a packet output timing comes in this state, the round is started. The scheduling unit 42 takes out the flow ID a from the scheduling queue 44A and gives it to the packet output unit 30. In response, the packet output unit 30 outputs the top packet a1(100) from the packet queue 20a.

Then, the scheduling unit 42 decrements the counter value for the flow a by the packet length 100 bytes of this output packet. In this case, the counter value for the flow a becomes 400. Here, the packet a2(500) becomes a new top packet in the packet queue 20a for the flow a, but a value obtained by subtracting the packet length 500 of this packet from the current counter value 400 is less than 0, so that the flow ID a is next entered into the scheduling queue 44B for the purpose of outputting this packet a2(500).

Next, the scheduling unit 42 takes out the flow ID b from the scheduling queue 44A, and in response, the packet b1(300) is outputted by the packet output unit 30. Then, the scheduling unit 42 decrements the counter value for the flow b by the packet length 300 bytes of this output packet. In this case, the counter value for the flow b becomes 200. Here, the packet b2(100) becomes a new top packet in the packet queue 20b for the flow b, but a value obtained by subtracting the packet length 100 of this packet from the current counter value 200 is greater than 0, so that the flow ID b is next entered into the scheduling queue 44A for the purpose of outputting this packet b2(100).

By repeating the similar operations, the packets are sequentially outputted until the scheduling queue 44A becomes empty, in an order of: a1(100), b1(300), d1(300), b2(100), d2(100). Here it is assumed that no new packet arrives while outputting these packets. If a packet of the flow c newly arrives while outputting these packets, the flow ID c will be entered into the scheduling queue 44A.

After the output of the packet d2(100), the packet queue 20d for the flow d becomes empty, so that the flow ID d will not be entered into either one of the scheduling queues 44A and 44B. Also, the weight value 500 is set into the counter value for the flow d. Here, the timing for setting the weight value 500 into the counter value for the flow d can be either a timing immediately after the end of the current round or a timing of a new packet arrival at this packet queue 20d after the end of the current round.

FIG. 3 shows a state at the end of the round where the scheduling queue 44A became empty, which results from the state of FIG. 2. In FIG. 3, the counter values for the flows a and b are greater than 500 because, out of the number of bytes (500) that was transmittable in the previous round, a part that could not have been outputted because a packet length of the next packet was greater than the counter value in the previous round is carried over to the next new round, as in the conventional DRR.

When the state transition to a state shown in FIG. 3 is made, the scheduling queue 44B is immediately selected as a queue from which the flow ID is to be taken out for the purpose of packet output, and the new round is started. After the round starts, if packets of the flows c and d newly arrive, the flow IDs c and d will be entered into the scheduling queue 44B.

As described, according to this first embodiment, the two scheduling queues for holding the scheduling information are provided, one for those packet queues that are currently capable of transmitting packets and another one for the other packet queues which are currently not capable of transmitting packets.

Consequently, when a period during which the scheduling information is sequentially outputted from one and the same scheduling queue is regarded as a round, it is possible to realize the weighted fair queueing round by round similarly as in a case of the conventional DRR. In addition, the amount of calculations required for the scheduling operation becomes constant regardless of a number of flows, just as in the conventional DRR.

In addition, each scheduling information is used for the output of one top packet from the corresponding packet queue, so that unlike the conventional DRR, the scheduling operation will not continue to select packets from the same flow until it becomes no longer possible to decrement the counter or the packet queue becomes empty, and therefore it is possible to reduce the burstiness for each flow in a time period shorter than one round and the fairness characteristic can be improved.

Referring now to FIG. 4 to FIG. 7, the second embodiment of a packet scheduling scheme according to the present invention will be described in detail.

Figure 4:
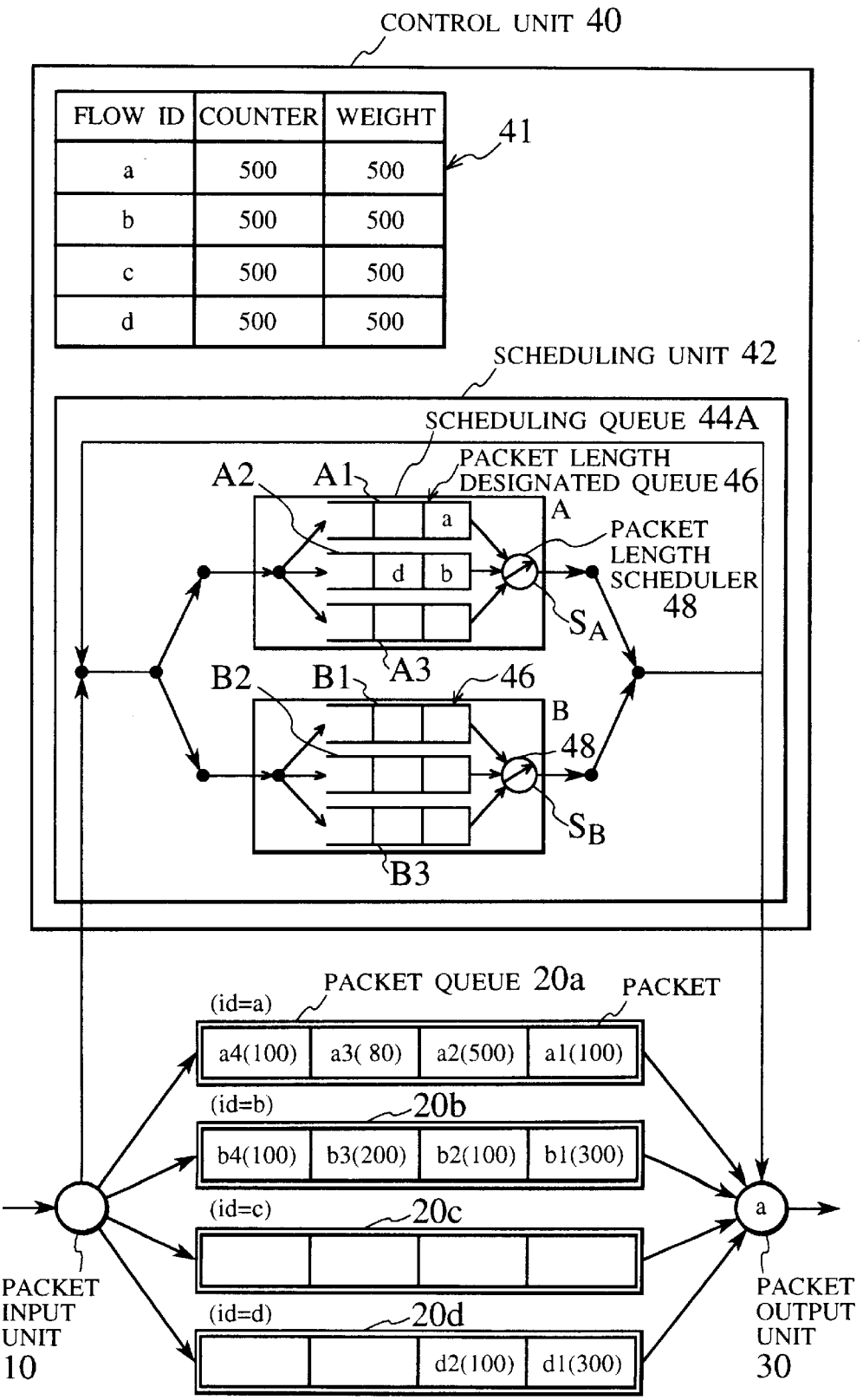
FIG. 4 is a block diagram of a packet scheduling apparatus in the second embodiment of a packet scheduling scheme according to the present invention, in one exemplary state at the beginning of a round.

FIG. 4 shows a configuration of a packet scheduling apparatus according to this second embodiment, which generally comprises a packet input unit 10, a prescribed number of packet queues 20 (20a, 20b, 20c and 20d) provided in correspondence to flows, a packet output unit 30 and a control unit 40.

The control unit 40 has a scheduling unit 42 and a memory unit 41 for holding a counter value and a weight value in correspondence to each flow ID. The scheduling unit 42 has two scheduling queues 44 (44A and 44B).

In addition, in this second embodiment, each scheduling queue 44 has a prescribed number (three in this embodiment) of packet length designated queues 46 which are provided in correspondence to different packet length ranges, and a packet length scheduler 48 connected with outputs of these packet length designated queues 46.

This packet scheduling apparatus of FIG. 4 differs from that of FIG. 2 only in the internal configuration of the scheduling queues 44, so that the detailed description of the other elements that are identical to those of FIG. 2 will be omitted.

In this second embodiment, the scheduling queue 44A (44B) is formed by three packet length designated queues A1, A2, A3 (B1, B2, B3), and the packet length scheduler $S_A$ ($S_B$).

Here, the flow IDs of those packets with the packet lengths less than or equal to 100 bytes among the top packets of the packet queues 20 are to be entered into the packet length designated queue A1 or B1, the flow IDs of those packets with the packet lengths less than or equal to 300 bytes and greater than 100 bytes among the top packets of the packet queues 20 are to be entered into the packet length designated queue A2 or B2, and the flow IDs of those packets with the packet lengths less than or equal to 500 bytes and greater than 300 bytes among the top packets of the packet queues 20 are to be entered into the packet length designated queue A3 or B3.

Each packet length scheduler 48 takes out the scheduling information from each connected packet length designated queue at a rate according to an inverse of the representative value (such as the maximum value) of the packet length range assigned to that packet length designated queue.

For example, the packet length scheduler SA realizes the weighted fair queueing among the packet length designated queues A1, A2 and A3 with a relative weight ratio of 1/100:1/300:1/500=15:5:3. Similarly, the packet length scheduler SB realizes the weighted fair queueing among the packet length designated queues B1, B2 and B3 with a relative weight ratio of 1/100:1/300:1/500=15:5:3. Here, the scheduling algorithm used in each packet length scheduler 48 can be any desired weighted fair queueing algorithm.

Similarly as in the first embodiment described above, in FIG. 4, a character string appearing in each packet indicates a packet identification information. For example, a packet with an indication "b3(200)" is the third arrived packet of the flow b, whose packet length is 200 bytes. Here, the packet may have a variable length. Also, it is assumed that there are four flows a, b, c and d.

In this embodiment, the maximum packet length is assumed to be 500 bytes, and the weights $w_a$, $w_b$, $w_c$ and $w_d$ of the flows a, b, c and d are assumed to be all equal to each other for the sake of simplicity, although the weights of the different flows may be different in general. For the sake of definiteness, it is assumed that $w_a=w_b=w_c=w_d=500$ (bytes) in the following description.

Also, in this embodiment, the counter value (amount of packets), a packet length of a packet, and the weight value are all expressed in byte units, but they can be expressed in any desired units.

Now, the operation of the packet scheduling apparatus of FIG. 4 will be described in detail by using a concrete example.

FIG. 4 shows an exemplary state of the packet scheduling apparatus in which four packets from the flow a, four packets from the flow b, and two packets from the flow d have arrived after the scheduling operation start and no packet has been outputted yet. Here, it is assumed that the scheduling queue 44B has been currently selected for the scheduling information output.

In this state, the counter values are all 500, while a packet length is less than or equal to 500 bytes, so that the flow IDs a, b and d of the flows a, b and d for which the packet queues 20 are not empty are entered into the scheduling queue 44A which is currently not selected for the scheduling information output, as shown in FIG. 4.

Within the scheduling queue 44A, the flow ID a is entered into the packet length designated queue A1 because the packet length of the top packet in the packet queue 20a is 100 bytes, while the flow IDs b and d are entered into the packet length designated queue A2 because the packet length of the top packets in the packet queues 20b and 20d is 300 bytes.

When a packet output timing comes in this state, the round is started. By the prescribed algorithm of the packet length scheduler 48 in the scheduling unit 42, one nonempty packet length designated queue 46 is selected. Here, assuming that the packet length designated queue A1 is selected, the scheduling unit 42 takes out the flow ID a from the packet length designated queue A1 and gives it to the packet output unit 30. In response, the packet output unit 30 outputs the top packet a1(100) from the packet queue 20a.

Then, the scheduling unit 42 decrements the counter value for the flow a by the packet length 100 bytes of this output packet. In this case, the counter value for the flow a becomes 400. Here, the packet a2(500) becomes a new top packet in the packet queue 20a for the flow a, but a value obtained by subtracting the packet length 500 of this packet from the current counter value 400 is less than 0, so that the flow ID a is next entered into the packet length designated queue B3 in the scheduling queue 44B for the purpose of outputting this packet a2(500).

Next, the scheduling unit 42 takes out the flow ID b from the packet length designated queue A2 in the scheduling queue 44A (which is selected by the packet length scheduler 48 in this case because the packet length designated queue A2 is the only one non-empty queue), and in response, the packet b1(300) is outputted by the packet output unit 30. Then, the scheduling unit 42 decrements the counter value for the flow b by the packet length 300 bytes of this output packet. In this case, the counter value for the flow b becomes 200. Here, the packet b2(100) becomes a new top packet in the packet queue 20b for the flow b, but a value obtained by subtracting the packet length 100 of this packet from the current counter value 200 is greater than 0, so that the flow ID b is next entered into the packet length designated queue A1 in the scheduling queue 44A for the purpose of outputting this packet b2(100).

By repeating the similar operations, the packets are sequentially outputted until the scheduling queue 44A becomes empty, in an order of: a1(100), b1(300), d1(300), b2(100), d2(100). Here it is assumed that no new packet arrives while outputting these packets. If packets of the flows c and d newly arrive while outputting these packets, the flow IDs c and d will be entered into the packet length designated queues corresponding to the arrived packet lengths in the scheduling queue 44A.

After the output of the packet d2(100), the packet queue 20d for the flow d becomes empty, so that the flow ID d will not be entered into either one of the scheduling queues 44A and 44B. Also, the weight value 500 is set into the counter value for the flow d.

Figure 5:
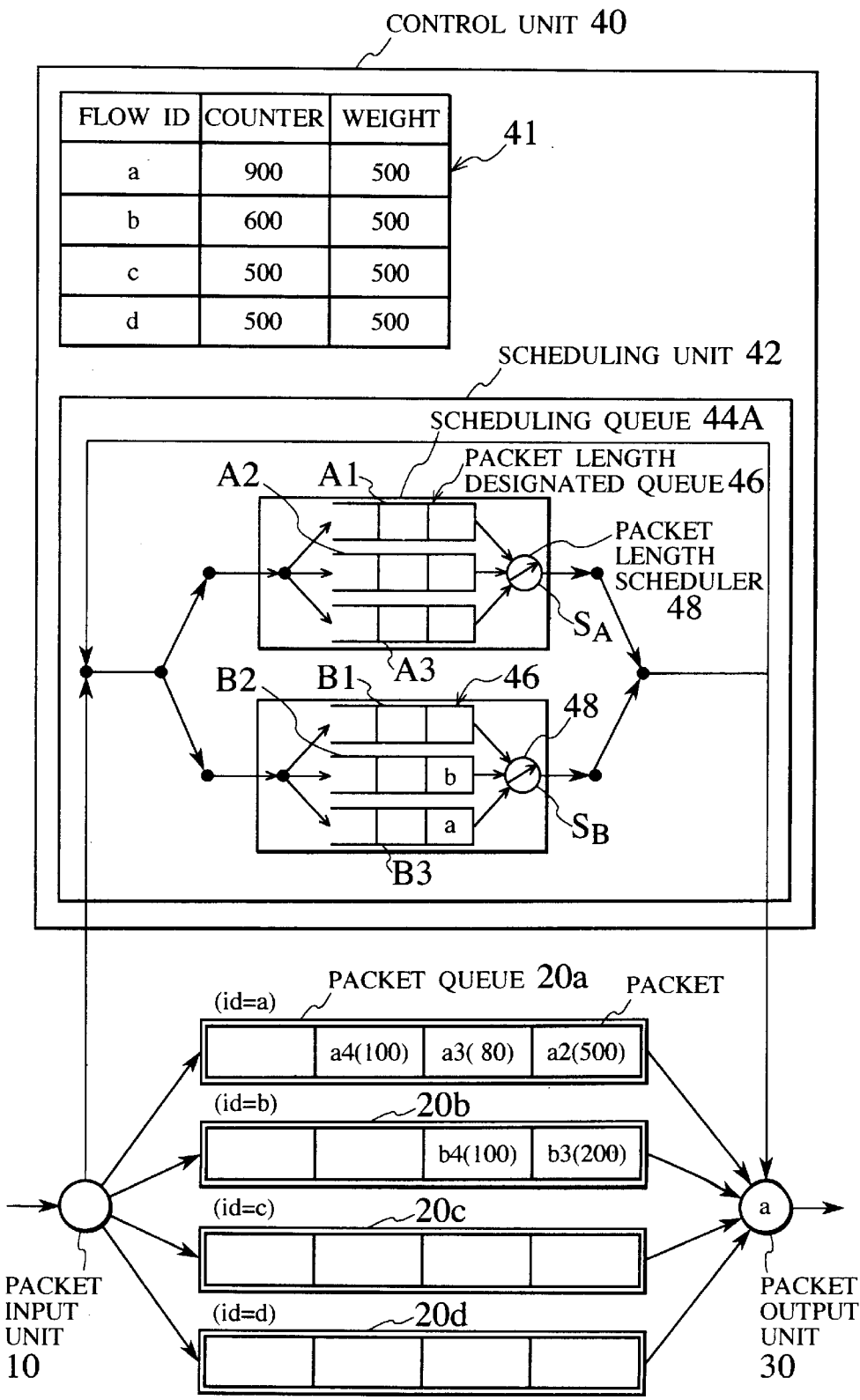
FIG. 5 is a block diagram of a packet scheduling apparatus in the second embodiment of a packet scheduling scheme according to the present invention, in another exemplary state at the end of a round.

FIG. 5 shows a state at the end of the round where the scheduling queue 44A became empty, which results from the state of FIG. 4. In FIG. 5, the counter values for the flows a and b are greater than 500 because, out of the number of bytes (500) that was transmittable in the previous round, a part that could not have been outputted because a packet length of the next packet was greater than the counter value in the previous round is carried over to the next new round, as in the conventional DRR.

When the state transition to a state shown in FIG. 5 is made, the scheduling queue 44B is immediately selected as a queue from which the flow ID is to be taken out for the purpose of packet output, and the new round is started.

After the round starts, by the prescribed algorithm of the packet length scheduler 48 in the scheduling unit 42, one non-empty packet length designated queue 46 is selected. Here, assuming that the packet length designated queue B2 is selected, the scheduling unit 42 takes out the flow ID b from the packet length designated queue B2 and gives it to the packet output unit 30. In response, the packet output unit 30 outputs the top packet b3(200) from the packet queue 20*b*. If a packet c1(100) of the flow c newly arrives, the flow ID c will be entered into the packet length designated queue B1 in the scheduling queue 44B.

These operations are subsequently repeated in the packet scheduling apparatus of this second embodiment.

Next, an example of the scheduling algorithm that can be used by the packet length scheduler 48 in this second embodiment will be described.

Figure 6:
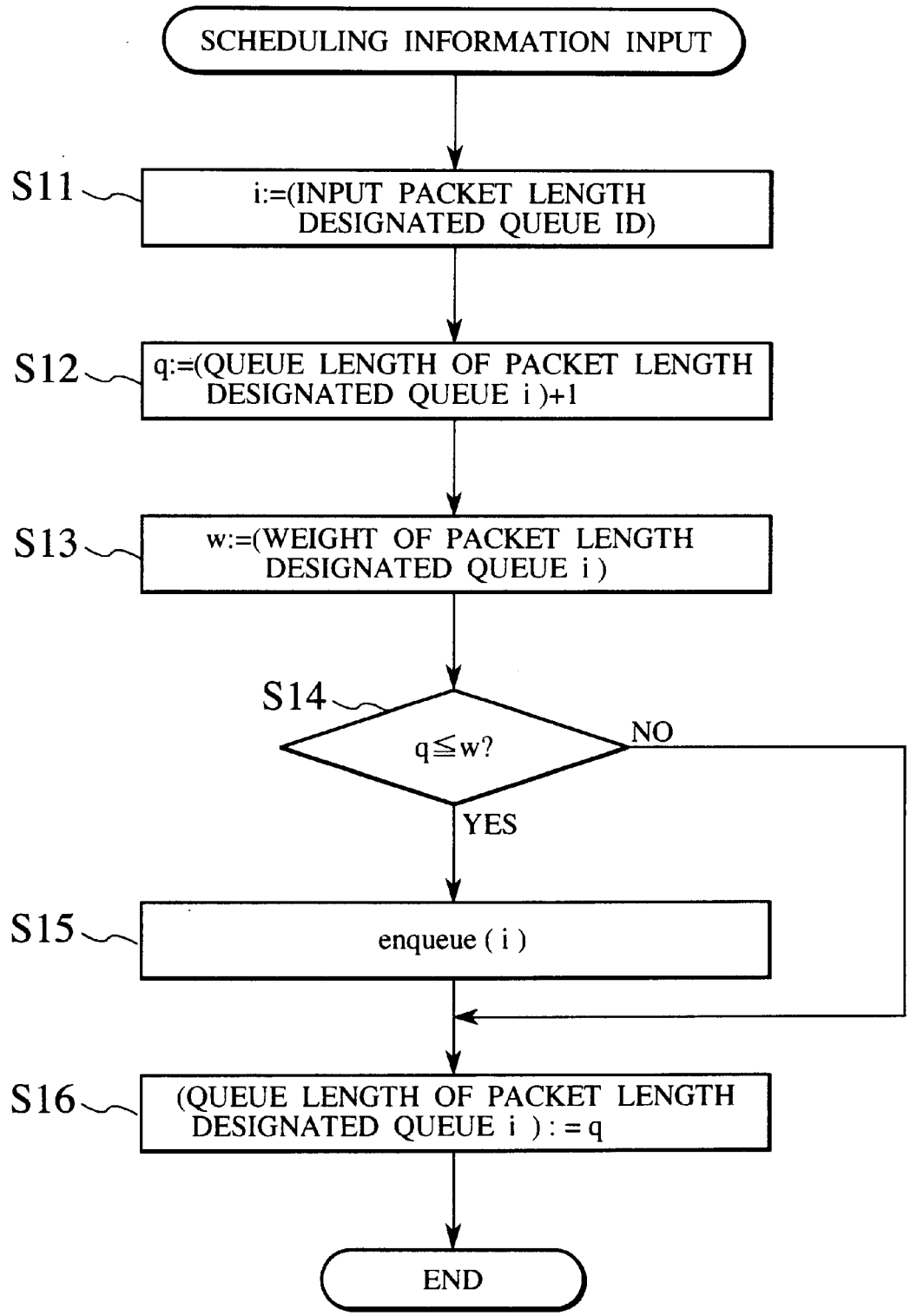
FIG. 6 is a flow chart for an exemplary operation of a packet length scheduler at a time of scheduling information input in the second embodiment of a packet scheduling scheme according to the present invention.
Figure 7:
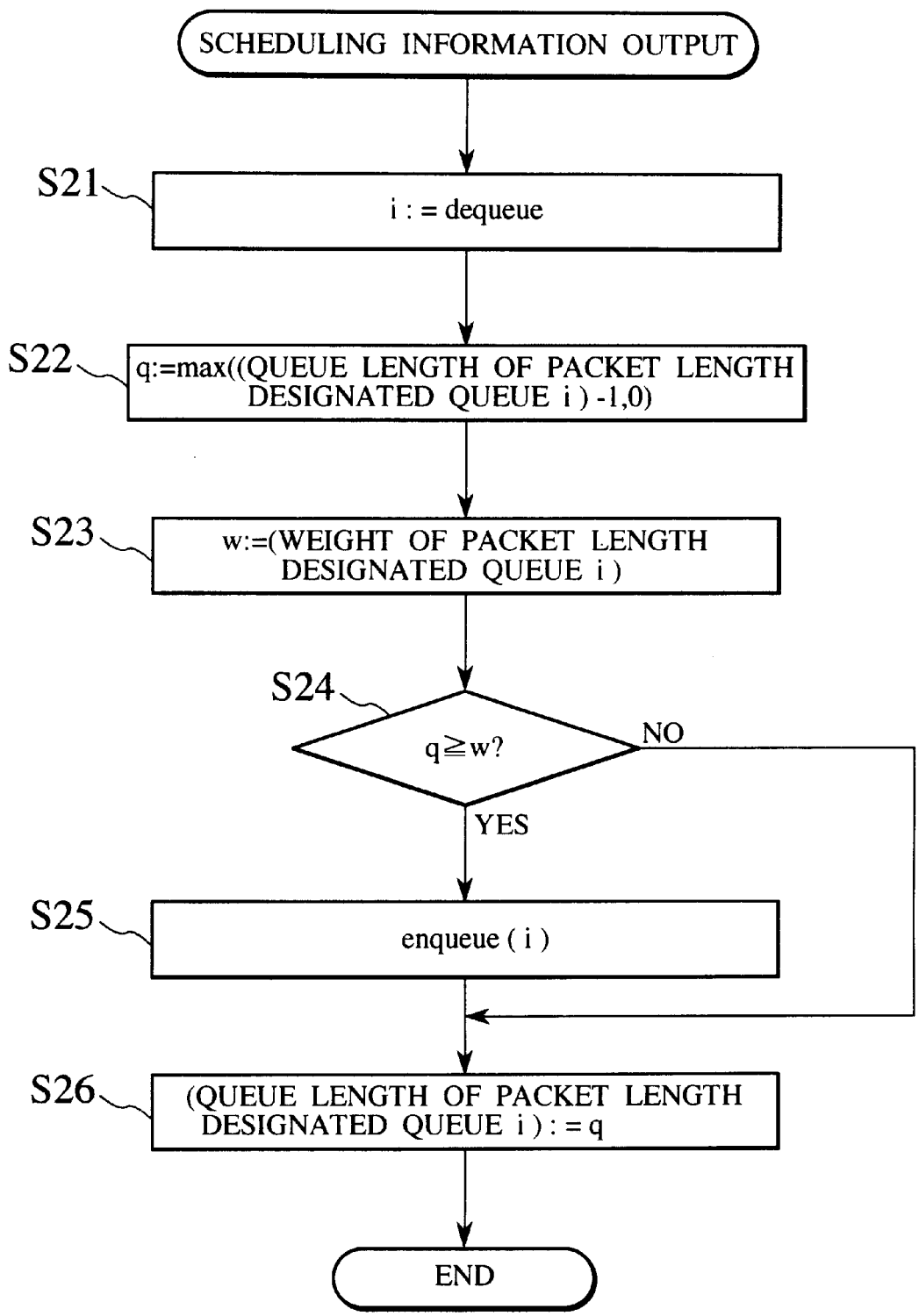
FIG. 7 is a flow chart for an exemplary operation of a packet length scheduler at a time of scheduling information output in the second embodiment of a packet scheduling scheme according to the present invention.

FIG. 6 shows the operation of the packet length scheduler 48 at a time of the scheduling information input, and FIG. 7 shows the operation of the packet length scheduler 48 at a time of the scheduling information output, according to the exemplary scheduling algorithm.

Here, the flow ID is used as the scheduling information, and the packet length scheduler is assumed to have one FIFO queue (now shown) for holding the packet length designated queue IDs for the purpose of the scheduling.

First, the operation at a time of the scheduling information input is carried out according to the flow chart of FIG. 6 as follows.

Namely, i is set to be the input packet length designated queue ID (S11), q is set to be the queue length of the packet length designated queue i (a number of flow IDs in the packet length designated queue i) plus 1 (S12), and w ($\geq 1$) is set to be the weight of the packet length designated queue i (S13).

Then, if $q \leq w$ (S14 YES), the packet length designated queue ID i is entered into the FIFO queue (S15). This operation is denoted as "enqueue (i)" in FIG. 6. Then, when S14 is NO or after S15, the queue length of the packet length designated queue i is set to be the value of q as set by S12 (S16).

Next, the operation at a time of the scheduling information output is carried out according to the flow chart of FIG. 7 as follows.

Namely, the top packet length designated queue ID in the FIFO queue is taken out and set as i (S21). This operation is denoted as "dequeue" in FIG. 7. Then, q is set to be the larger one of [the queue length of the packet length designated queue i minus 1] and 0 (S22), and w ($\geq 1$) is set to be the weight of the packet length designated queue i (S23).

Then, if $q \geq w$ (S24 YES), the packet length designated queue ID i is entered into the FIFO queue (S25). This operation is denoted as "enqueue (i)" in FIG. 7. Then, when S24 is NO or after S25, the queue length of the packet length designated queue i is set to be the value of q as set by S22 (S26).

As described, according to this second embodiment, the queue into which the scheduling information is to be entered is changed according to the packet length of the input packet, and it becomes relatively harder to output a packet with a larger packet length compared with a packet with a smaller packet length, so that in addition to the same effects as in the first embodiment described above, it also becomes possible to improve the fairness characteristic in view of the packet length difference.

Figure 8:
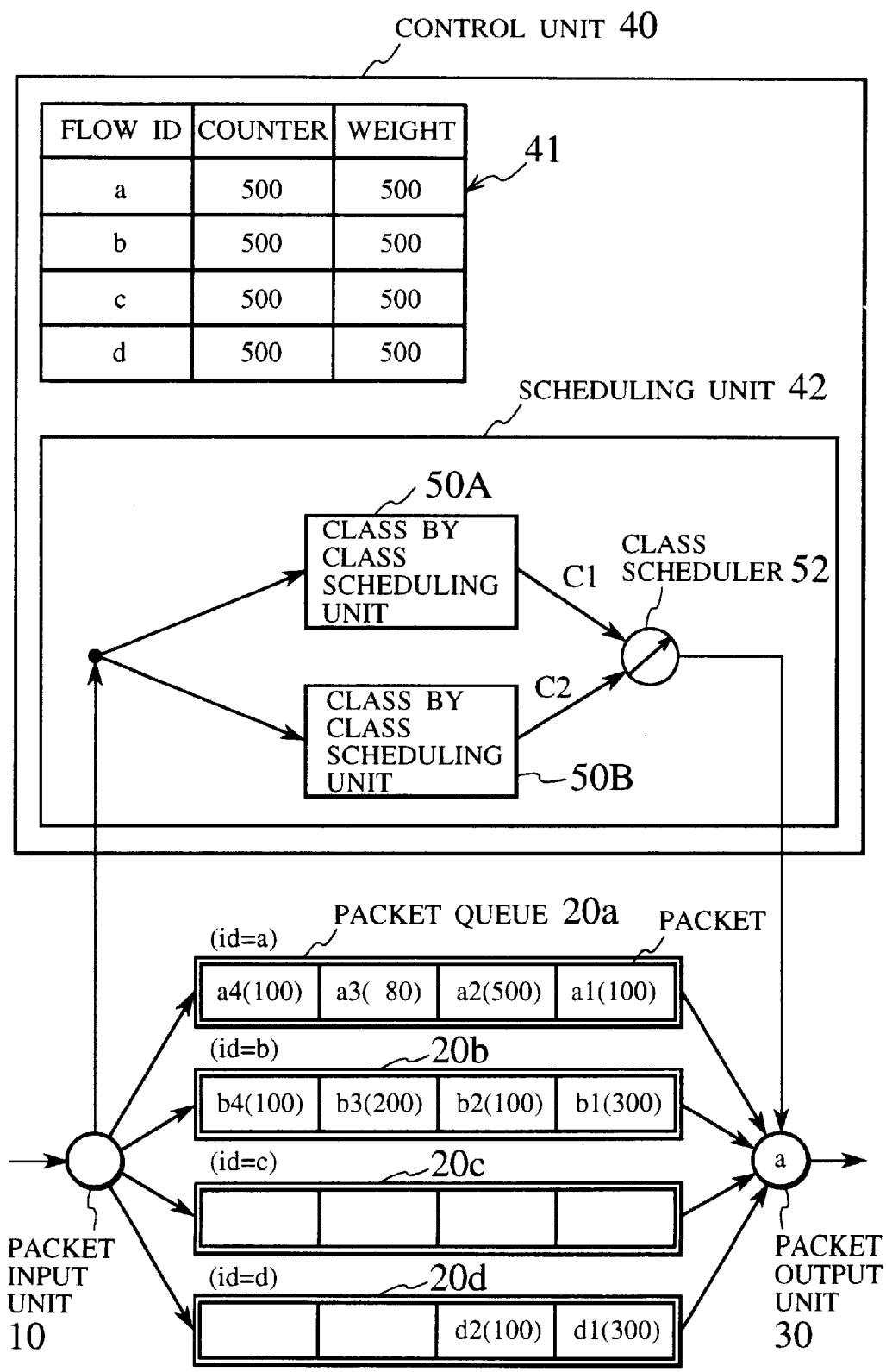
FIG. 8 is a block diagram of a packet scheduling apparatus in the third embodiment of a packet scheduling scheme according to the present invention.

Referring now to FIG. 8, the third embodiment of a packet scheduling scheme according to the present invention will be described in detail.

This third embodiment is directed to a case of providing a plurality of scheduling units according to the first or second embodiment described above, and switching these plurality of scheduling units by an upper level scheduler.

FIG. 8 shows a configuration of a packet scheduling apparatus according to this third embodiment, which generally comprises a packet input unit 10, a prescribed number of packet queues 20 (20*a*, 20*b*, 20*c* and 20*d*) provided in correspondence to flows, a packet output unit 30 and a control unit 40.

The control unit 40 has a scheduling unit 42 and a memory unit 41 for holding a counter value and a weight value in correspondence to each flow ID.

The scheduling unit 42 has a prescribed number (two in this embodiment) of class by class scheduling units 50 (50A and 50B), and a class scheduler 52. FIG. 8 shows an exemplary case in which a number of hierarchical levels is two and the scheduling queues are provided separately for different service classes in a lower hierarchical level, where a number of service classes is assumed to be two.

In FIG. 8, the scheduling unit 42 is formed by two class by class scheduling units 50 (50A and 50B) and one class scheduler 52, where the class by class scheduling unit 50A holds the flow IDs of a realtime class C1 as the scheduling information, while the class by class scheduling unit 50B holds the flow IDs of a non-realtime class C2 as the scheduling information.

The configuration of each class by class scheduling unit 50 is basically the same as that of the first embodiment (FIG. 2) or the second embodiment (FIG. 4), and the configuration and operation of the packet input unit 10, the packet queues 20, and the packet output unit 30 are also the same as those of the first or second embodiment.

In this third embodiment, when a packet arrives, the scheduling unit 42 selects one class by class scheduling unit 50 according to the service class of the input packet, and enters the scheduling information inputted from the packet input unit 10 into the selected class by class scheduling unit 50. The class scheduler 52 takes out the scheduling information from the class by class scheduling unit 50A as long as there is at least one scheduling information held in the class by class scheduling unit 50A, or from the class by class scheduling unit 50B otherwise, and gives it to the packet output unit 30.

Here, the scheduling algorithm of the class scheduler 52 can be any desired algorithm according to the service policies of the classes used.

According to this third embodiment, the scheduling according to the first or second embodiment described above can be realized for each class separately. As a result, it becomes possible to handle the flows of the realtime class and the non-realtime class separately.

As described, according to the packet scheduling scheme of the present invention, the arrived packet is entered into one of a plurality of packet queues. Then, one packet queue is selected according to an amount of packets (number of bytes) that is currently transmittable by each packet queue, and a top packet is outputted from the selected packet queue, while the currently transmittable amount of packets for the selected packet queue is updated.

The packet queue for packet output can be selected to be a non-empty packet queue for which a value obtained by subtracting a packet length of a top packet from the currently transmittable amount of packets is greater than or equal to 0. When there are more than one packet queues that can be selected, a packet queue different from the previously selected packet queue is selected.

The currently transmittable amount of packets for each packet queue is given as follows.

First, a weight for the purpose of packet output is assigned to each packet queue. Here, an identical weight may be assigned to all the packet queues, or different weights may be assigned to different packet queues. Each weight is set to be greater than or equal to the maximum packet length that can be entered into each packet queue.

When a new packet is entered into an empty packet queue, the currently transmittable amount of packets for that packet queue is set to be the corresponding weight value.

When a non-empty packet queue becomes empty as a result of a packet output from that packet queue, the currently transmittable amount of packets for that packet queue is also set to be the corresponding weight value.

When a non-empty packet queue remain non-empty as a result of a packet output from that packet queue, the currently transmittable amount of packets is updated by subtracting a packet length of the output packet from the currently transmittable amount of packets.

When there is no more packet queue that can be selected, the currently transmittable amount of packets for each non-empty packet queue is updated by adding the corresponding weight value to the currently transmittable amount of packets.

In this manner, the packet scheduling scheme according to the present invention selects a packet queue for packet output which is different from the previously selected packet queue as much as possible, so that it becomes possible to reduce the busrtiness for each flow in a time scale shorter than one round and therefore the fairness characteristic can be improved.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the scheduling unit in any of the above described embodiments can be conveniently implemented in a form of a software package separately.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet scheduling apparatus, comprising:
a plurality of packet queues for holding packets;
an input unit for inputting arrived packets into the packet queues;
a scheduling unit for sequentially selecting an output packet queue from the packet queues, according to a prescribed criterion based on an amount of packets currently transmittable by each packet queue, such that the output packet queue is selected to be different from a previously selected output packet queue when there are more than one packet queues that satisfy the prescribed criterion, wherein the input unit enters a scheduling information for each arrived packet into the scheduling unit while inputting each arrived packet into one of the packet queues, and the scheduling unit has two scheduling queues and selects one scheduling queue as a current round scheduling queue for holding the scheduling information for packets held in those packet queues which are currently capable of transmitting packets according to the prescribed criterion while using another scheduling queue as a next round scheduling queue for holding the scheduling information for packets held in those packet queues which are currently not capable of transmitting packets, so that the scheduling unit takes out one scheduling information from the current round scheduling queue and selects the output packet queue according to the scheduling information at a time of packet output; and
an output unit for outputting a top packet from the output packet queue sequentially selected by the scheduling unit.

2. The apparatus of claim 1, wherein the packet queues are provided in correspondence to flows, and the input unit inputs each arrived packet into one of the packet queues according to a flow of each arrived packet.

3. The apparatus of claim 1, wherein each packet queue satisfies the prescribed criterion when a value obtained by subtracting a packet length of a top packet in said each packet queue from the amount of packets currently transmittable by said each packet queue is greater than or equal to zero.

4. The apparatus of claim 1, further comprising a counter unit for holding the amount of packets currently transmittable by each packet queue and sequentially updating the amount of packets currently transmittable by the output packet queue when the output unit outputs the top packet from the output packet queue.

5. The apparatus of claim 1, wherein the scheduling unit continues to select the output packet queue according to the scheduling information held in said one scheduling queue until said one scheduling queue becomes empty, and selects said another scheduling queue as the current round scheduling queue when said one scheduling queue becomes empty while using said one scheduling queue as the next round scheduling queue.

6. The apparatus of claim 1, further comprising a counter unit for holding the amount of packets currently transmittable by each packet queue, and the current round scheduling queue holds the scheduling information for packets held in those packet queues for which a value obtained by subtracting a packet length of a top packet from a corresponding counter value is greater than or equal to 0, while the next round scheduling queue holds the scheduling information for packets held in those packet queues for which a value obtained by subtracting a packet length of a top packet from a corresponding counter value is less than 0.

7. The apparatus of claim 6, wherein the packet queues are assigned with weights for packet output purpose independently, and if the output packet queue becomes empty as a result of said packet output, the scheduling unit sets a value of a corresponding weight to a corresponding counter value.

8. The apparatus of claim 6, wherein if the output packet queue does not become empty as a result of said packet output and the scheduling information for a new top packet of the output packet queue resulting from said packet output is to be entered into the current round scheduling queue, the scheduling unit decrements a corresponding counter value as much as a packet length of a packet outputted by said packet output.

9. The apparatus of claim 6, wherein the packet queues are assigned with weights for packet output purpose independently, and if the output packet queue does not becomes empty as a result of said packet output and the scheduling information for a new top packet of the output packet queue resulting from said packet output is to be entered into the next round scheduling queue, the scheduling unit increments a corresponding counter value as much as a value of a corresponding weight.

10. The apparatus of claim 1, wherein each of the two scheduling queues has:
   a plurality of packet length designated queues which hold the scheduling information according to a packet length of a top packet of each packet queue; and
   a packet length scheduler which takes out the scheduling information from one of the packet length designated queues, such that the scheduling information is taken out at a higher rate from a packet length designated queue that is assigned to hold the scheduling information corresponding to a top packet having a longer packet length.

11. The apparatus of claim 10, wherein the packet length scheduler takes out the scheduling information from each packet length designated queue at a rate according to an inverse of a representative value of a packet length range assigned to said each packet length designated queue.

12. The apparatus of claim 10, wherein each packet queue satisfies the prescribed criterion when a value obtained by subtracting a packet length of a top packet in said each packet queue from the amount of packets currently transmittable by said each packet queue is greater than or equal to zero and the packet length scheduler takes out the scheduling information for packets held in said each packet queue.

13. The apparatus of claim 1, wherein the scheduling unit has a hierarchical structure formed by more than one lower level scheduling units and an upper level scheduling unit.

14. The apparatus of claim 13, wherein the hierarchical structure of the scheduling unit is formed by:
   the lower level scheduling units in forms of a plurality of class by class scheduling units provided in correspondence to a plurality of classes of packets, which hold the scheduling information and select the output packet queue according to the scheduling information for respective classes; and
   the upper level scheduling unit in a form of a class scheduler which takes out the scheduling information from one of the class by class scheduling units according to a hierarchy relationship among the classes.

15. A packet scheduling apparatus, comprising:
   a plurality of packet queues to which weights for packet output purpose can be assigned independently;
   a packet input unit which inputs received packets into prescribed ones of the packet queues;
   a counter unit which holds counter values indicating an amount of packets currently transmittable by each packet queue;
   a scheduling unit which holds scheduling information to be used for outputting packets held in the packet queues, and selects an output packet queue from which a top packet is to be outputted according to the scheduling information; and
   a packet output unit which outputs a top packet from the output packet queue selected by the scheduling unit;
   wherein the scheduling unit has first and second scheduling queues for holding the scheduling information corresponding to top packets of non-empty packet queues;
   the first scheduling queue holds the scheduling information of those packet queues for which a value obtained by subtracting a packet length of a top packet from a corresponding counter value is greater than or equal to 0, while the second scheduling queue holds the scheduling information of those packet queues for which a value obtained by subtracting a packet length of a top packet from a corresponding counter value is less than 0;
   the scheduling unit takes out one scheduling information from the first scheduling queue, at a time of packet output;
   the scheduling unit sets a value of a corresponding weight to a corresponding counter value, if the output packet queue becomes empty as a result of said packet output;
   the scheduling unit decrements a corresponding counter value as much as a packet length of a packet outputted by said packet output, if the output packet queue does not become empty as a result of said packet output and the scheduling information for a new top packet of the output packet queue resulting from said packet output is to be entered into the first scheduling queue;
   the scheduling unit increments a corresponding counter value as much as a value of a corresponding weight, if the output packet queue does not becomes empty as a result of said packet output and the scheduling information for a new top packet of the output packet queue resulting from said packet output is to be entered into the second scheduling queue; and
   the scheduling unit switches the first scheduling unit and the second scheduling unit, if the first scheduling queue becomes empty as a result of said packet output.

16. The apparatus of claim 15, wherein each of the first and second scheduling queues has:
   a plurality of packet length designated queues which hold the scheduling information according to a packet length of a top packet of each packet queue; and
   a packet length scheduler which takes out the scheduling information from one of the packet length designated queues, such that the scheduling information is taken out at a higher rate from a packet length designated queue that is assigned to hold the scheduling information corresponding to a top packet having a longer packet length.

17. The apparatus of claim 16, wherein the packet length scheduler takes out the scheduling information from each packet length designated queue at a rate according to an inverse of a representative value of a packet length range assigned to said each packet length designated queue.

18. The apparatus of claim 15, wherein the scheduling unit has a hierarchical structure formed by more than one lower level scheduling units and an upper level scheduling unit.

19. The apparatus of claim 18, wherein the hierarchical structure of the scheduling unit is formed by:
   the lower level scheduling units in forms of a plurality of class by class scheduling units provided in correspondence to a plurality of classes of packets, which hold the scheduling information and select the output packet queue according to the scheduling information for respective classes; and the upper level scheduling unit in a form of a class scheduler which takes out the scheduling information from one of the class by class scheduling units according to a hierarchy relationship among the classes.

20. A packet scheduling method, comprising the steps of:

holding packets in a plurality of packet queues by inputting arrived packets into the packet queues and entering a scheduling information for each arrived packet into a scheduler while inputting each arrived packet into one of the packet queues;

sequentially selecting an output packet queue from the packet queues at the scheduler, according to a prescribed criterion based on an amount of packets currently transmittable by each packet queue, such that the output packet queue is selected to be different from a previously selected output packet queue when there are more than one packet queues that satisfy the prescribed criterion, wherein the scheduler has two scheduling queues and selects one scheduling queue as a current round scheduling queue for holding the scheduling information for packets held in those packet queues which are currently capable of transmitting packets according to the prescribed criterion while using another scheduling queue as a next round scheduling queue for holding the scheduling information for packets held in those packet queues which are currently not capable of transmitting packets, so that the scheduler takes out one scheduling information from the current round scheduling queue and selects the output packet queue according to the scheduling information at a time of packet output; and outputting a top packet from the output packet queue sequentially selected by the scheduling step.

21. A computer usable medium having computer readable program codes embodied therein for causing a computer to function as a scheduler of a packet scheduling apparatus having a plurality of packet queues for holding packets, an input unit for inputting arrived packets into the packet queues, and an output unit for outputting a top packet from one packet queue, the computer readable program codes including:

a first computer readable program code for causing said computer to judge whether each packet queue satisfies a prescribed criterion based on an amount of packets currently transmittable by each packet queue; and a second computer readable program code for causing said computer to sequentially select an output packet queue from the packet queues according to the judgement made by the first computer readable program code such that the output packet queue is selected to be different from a previously selected output packet queue when there are more than one packet queues that satisfy the prescribed criterions;

wherein the input unit enters a scheduling information for each arrived packet into the scheduler while inputting each arrived packet into one of the packet queues, and the second computer readable program code uses two scheduling queues and selects one scheduling queue as a current round scheduling queue for holding the scheduling information for packets held in those packet queues which are currently capable of transmitting packets according to the prescribed criterion while using another scheduling queue as a next round scheduling queue for holding the scheduling information for packets held in those packet queues which are currently not capable of transmitting packets, so that the second computer readable program code takes out one scheduling information from the current round scheduling queue and selects the output packet queue according to the scheduling information at a time of packet output.

* * * * *